United States Patent
Marseille et al.

(10) Patent No.: US 9,880,682 B2
(45) Date of Patent: Jan. 30, 2018

(54) DEVICE ADAPTED FOR EMULATING TACTILE CONTACTS ON A CAPACITIVE SCREEN

(71) Applicant: GEMALTO SA, Meudon (FR)

(72) Inventors: François-Xavier Marseille, Meudon (FR); Michel Thill, Meudon (FR)

(73) Assignee: GEMALTO SA, Meudon (FR)

( * ) Notice: Subject to any disclaimer, the term of this patent is extended or adjusted under 35 U.S.C. 154(b) by 213 days.

(21) Appl. No.: 14/758,242

(22) PCT Filed: Dec. 12, 2013

(86) PCT No.: PCT/EP2013/076392
§ 371 (c)(1),
(2) Date: Jun. 28, 2015

(87) PCT Pub. No.: WO2014/102067
PCT Pub. Date: Jul. 3, 2014

(65) Prior Publication Data
US 2016/0026296 A1   Jan. 28, 2016

(30) Foreign Application Priority Data

Dec. 27, 2012  (EP) .................................... 12306680

(51) Int. Cl.
*G06F 3/044* (2006.01)
*G06Q 20/34* (2012.01)
(Continued)

(52) U.S. Cl.
CPC .............. *G06F 3/044* (2013.01); *G06F 3/016* (2013.01); *G06F 3/0481* (2013.01);
(Continued)

(58) Field of Classification Search
None
See application file for complete search history.

(56) References Cited

U.S. PATENT DOCUMENTS

| 8,561,894 B1* | 10/2013 | Mullen | G07F 17/42 |
| | | | 235/381 |
| 2003/0085286 A1* | 5/2003 | Kelley | G06K 19/073 |
| | | | 235/492 |

(Continued)

FOREIGN PATENT DOCUMENTS

| DE | 102007029114 A1 | 1/2009 |
| WO | WO2012152389 A1 | 11/2012 |

OTHER PUBLICATIONS

PCT/EP2013/076392 International Search Report, dated Mar. 11, 2014, European Patent Office, P.B. 5818 Patentlaan 2 NL—2280 HV Rijswijk.

(Continued)

*Primary Examiner* — Patrick Edouard
*Assistant Examiner* — Douglas M Wilson
(74) *Attorney, Agent, or Firm* — The Jansson Firm; Pehr B. Jansson

(57) ABSTRACT

The invention relates to a device (CD) comprising a capacitive keyboard (KB) constituted of a plurality of keys (KY), each key comprising an active electrode (AEL) and an active ground plane (AGP), a microcontroller (MC) connected to said keyboard (KB) through active electrode (AEL) and active ground plane (AGP). Said microcontroller (MC) is adapted for managing said keyboard (KB) in a reverse manner for emulating a sequence of tactile contacts on a capacitive screen.

10 Claims, 1 Drawing Sheet

(51) Int. Cl.
*G06F 3/01* (2006.01)
*G06F 3/0481* (2013.01)
*G06F 3/0488* (2013.01)
*G06F 21/35* (2013.01)
*G06K 19/07* (2006.01)
*G06K 19/077* (2006.01)
*G07F 7/08* (2006.01)
*H03K 17/96* (2006.01)
*G06Q 20/38* (2012.01)
*G07F 7/10* (2006.01)

(52) U.S. Cl.
CPC .......... *G06F 3/04886* (2013.01); *G06F 21/35* (2013.01); *G06K 19/0723* (2013.01); *G06K 19/07707* (2013.01); *G06K 19/07709* (2013.01); *G06Q 20/341* (2013.01); *G06Q 20/385* (2013.01); *G07F 7/0806* (2013.01); *G07F 7/0846* (2013.01); *G07F 7/0853* (2013.01); *G07F 7/1033* (2013.01); *H03K 17/962* (2013.01); *H03K 2217/96062* (2013.01)

(56) References Cited

U.S. PATENT DOCUMENTS

| | | | |
|---|---|---|---|
| 2009/0144556 A1* | 6/2009 | Plet | G06F 21/34 713/185 |
| 2009/0159663 A1* | 6/2009 | Mullen | G06K 19/06206 235/379 |
| 2009/0322352 A1 | 12/2009 | Zachut et al. | |
| 2011/0304583 A1 | 12/2011 | Kruglick | |
| 2013/0106765 A1* | 5/2013 | Beecher | G06F 3/044 345/174 |
| 2013/0207793 A1* | 8/2013 | Weaber | G06F 1/1601 340/407.2 |

OTHER PUBLICATIONS

PCT/EP2013/076392 Written Opinion of the International Searching Authority, dated Mar. 11, 2014, European Patent Office D-80298 Munich.

* cited by examiner

DEVICE ADAPTED FOR EMULATING TACTILE CONTACTS ON A CAPACITIVE SCREEN

FIELD OF THE INVENTION

The present invention relates to devices comprising a capacitive keyboard and a microcontroller connected to said keyboard, and more particularly to "display cards" which are payment cards comprising display screens and touch-sensitive buttons.

BACKGROUND

Security is a major stake for banking transactions on the internet. The 3-D Secure dispositive, which is a security layer for online card transactions, is an example of security reinforcement for online payments. This protocol adds an authentication step for online payments, via a one-time password sent as part of a SMS text message to the mobile of the banking card owner.

This dispositive has been enhanced with two-in-one "display cards". A display card is a credit card comprising a display screen and a sensitive keyboard. This card allows avoiding the carrying of separate authentication device. Indeed, upon entering of a secret code on the sensitive keyboard, a "display card" generates a one-time password (OTP) displayed on the display screen. This one-time password is then entered in a terminal by the user for completing the transaction.

So as to avoid the typing step of the one-time password by the user, then saving time, a smart card reader can be used. However this solution obligates the user to have an adapted smart card reader and is time consuming.

SUMMARY

It is an object of the invention to describe a method which allows smart card reader to be avoided for enabling a communication between a smartcard and a device having a touch screen, for example for entering a one-time password.

To this end, the invention provides a device comprising a capacitive keyboard constituted of a plurality of keys, each key comprising an active electrode and an active ground plane, a microcontroller connected to said keyboard through said active electrode and active ground plane. Said microcontroller is adapted for managing said keyboard in a reverse manner for emulating a sequence of tactile contacts on a capacitive screen.

According to not limited embodiments, the device can comprise one or more of the following additional characteristics:
- the tactile contact is emulated by varying voltage on said ground plane by the microcontroller;
- the tactile contact is emulated by varying the capacitance of said electrode by the microcontroller;
- the keyboard comprise four electrodes used for emulating the sequence of tactile contacts;
- the device comprises a display screen, and the microcontroller is adapted for managing said display screen;
- the microcontroller is adapted for generating a one-time password upon entering of a predetermined code on the keyboard, and displaying said one-time password on the display screen;
- the sequence of tactile contacts to emulate is determined from a numerical code;
- the numerical code is the one-time password.

BRIEF DESCRIPTION OF THE DRAWINGS

Some embodiments of apparatus and/or methods in accordance with embodiments of the present invention are now described, by way of example only, and with reference to the accompanying drawings, in which.

DESCRIPTION OF EMBODIMENTS

In the following description, well-known functions or constructions by the man skilled in the art are not described in detail since they would obscure the invention in unnecessary detail.

Figure 1:
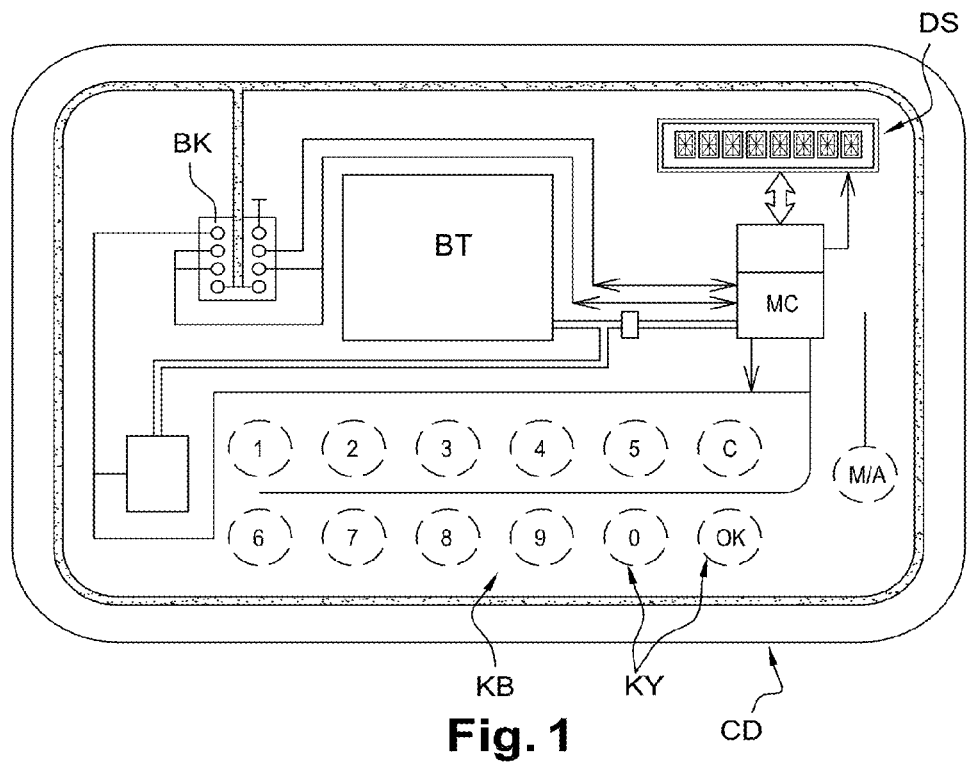
FIG. 1 shows a device according to a not limited embodiment of the invention.

FIG. 1 schematically illustrates a smart card CD comprising:
- a classical banking controller BK
- a battery BT
- a microcontroller MC linked to the banking controller BK, managing a plurality of peripherals
- a plurality of peripherals, which are:
  - a capacitive keyboard KB
  - a start-stop button M/A, for activating or turning off said keyboard KB. When the keyboard KB is activated, a user is allowed to use said keyboard KB.
  - a display screen DS.

Figure 2:
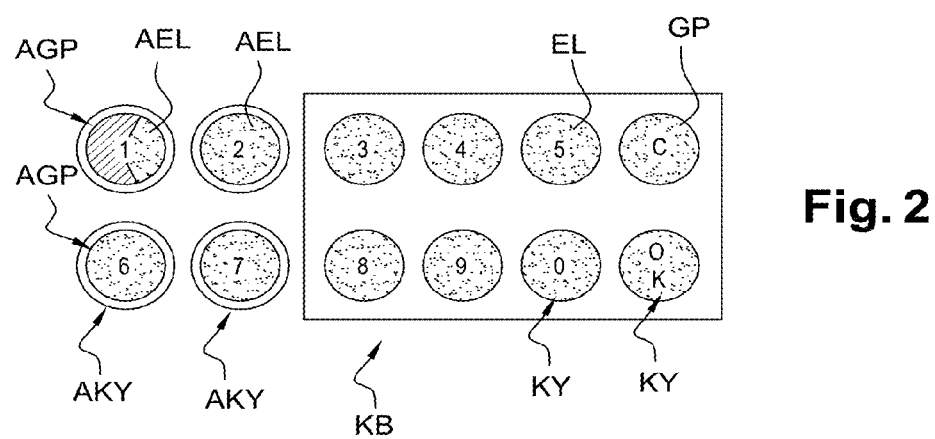
FIG. 2 shows a capacitive keyboard of the device of FIG. 1.

As illustrated by FIG. 2, the keyboard KB comprises a plurality of keys KY. The keyboard KB comprises twelve keys KY:
- ten keys corresponding to numbers zero to nine
- a key OK for validating, and
- a key C for correcting.

Every key KY comprises:
- an electrode EL,
- a ground plane GP connected to the microcontroller MC. It should be noted that ground planes GP can be shared between several keys KY.

The electrodes EL and the ground planes GP are layered: the electrodes EL are on the side of the display screen DS (the front of the card CD), whereas the ground planes are in the other side (the back of the card CD).

Eight keys KY share the same ground plane, whereas each of the fourth other keys has an individual ground plane. These fourth keys are named active keys AKY in the following description. The electrode of an active key is named active electrode AEL, and the ground plane of an active key is named active ground plane AGP.

The keyboard KB is adapted for working according to two modes:
- a first mode named capture information in the following description. In this mode, a user can use the keyboard KB by touching any key KY of the keyboard KB.
- a second mode named touch emulation in the following description, wherein the microcontroller MC is adapted for managing the voltage on the active ground planes AGP.

When the keyboard KB is in the capture information mode, the microcontroller MC sends pulses on all keys KY of the keyboard KB to detect which keys KY are pressed by a user. Indeed, the capacitance of an electrode EL of a key KY varies if said electrode EL is touched. The capacitances of keys KY are periodically calculated and compared to a reference capacitance. If a calculated capacitance is higher than the reference capacitance, then a touch on the associated key KY is detected.

If the microcontroller MC detects that a predetermined code has been entered on the keyboard KB, the microcontroller MC generates a one-time password, which is displayed on the display screen DS. The predetermined code is for example the banking code associated to the banking card CD, which is supposed to be known of the user only.

Then the microcontroller MC manages the display screen DS so as to display a first instruction on the display screen DS. Said first indication invites the user to place the card CD onto a capacitive screen, for example a screen of Smartphone or tactile tablet. The first instruction is an alphanumerical string, for example "PLACE". It should be noted that the card CD side in contact with the capacitive screen has to be the side comprising the active ground planes AGP, that is to say the back of the card CD in such a way that the user can continue to follow instructions on the screen.

Then the microcontroller MC turns the keyboard KB into the emulation mode. By managing voltages of the active ground planes AGP by the microcontroller, it is possible for the capacitive screen to detect the positioning of the card CD on the capacitive screen.

After a time enabling the device to determine the position of the card CD, the microcontroller MC applies a sequence of low frequency pulses on the active ground planes AGP. A particular combination of voltage variations on the four active ground planes AGP codes for the one-time password, as an example a pulse wide modulation can be used for transmitting "0" and "1" on each active ground plane AGP. The capacitive screen detects the voltage variations by successive scanning operations. Indeed, variation of voltage emulates tactile contacts.

When the transmission is ended, the microcontroller MC manages the display screen DS so as to display a second instruction, inviting the user to remove the card CD from the capacitive screen. This second indication is for example "REMOVE".

It should be noted that the number of active keys AK is not necessarily four. The larger this number is, the faster the one-time password is transmitted to the capacitive screen. However, the larger this number is, the more outputs of the microcontroller MC have to be used. Indeed, each active ground plane AGP is linked to the microcontroller MC. It should also be noted that a single active ground plane can be used for simplifying the microcontroller which needs a single connection for the active ground plane AGP but that may reduce the possible bit rate to few tens of bits per second.

In another embodiment, the second microcontroller MC does not control the voltages of the active ground planes AGP, but the capacitances of the active electrodes AEL. In this case, the card CD side in contact with the capacitive screen has to be the side comprising the active electrodes AEL, that is to say the front of the card CD. In this embodiment, the second microcontroller MC is able to vary the capacitances of the electrodes EL, which is also detectable by the capacitive screen. However, in this case, the user does not see the display screen DS, and particularly the second instruction informing the user that the one-time password transmission is ended.

Thanks to this device CD, a one-time password can be automatically transmitted to a capacitive screen: the user does not have to manually type the one-time password on the capacitive screen.

The invention claimed is:

1. A device, comprising:
a microcontroller connected for managing said keyboard in a reversed manner for transmitting a one-time password by emulating a sequence of tactile contacts on a capacitive screen by varying voltage on said active ground plane of said keys or by varying the capacitance of the active electrode of said keys thereby transmitting signals corresponding to said one time password from said device to said capacitive screen.

2. The device (CD) according to claim 1, wherein the keyboard (KB) comprise four active electrodes (AEL) and four active ground planes (AGP) used for emulating the sequence of tactile contacts.

3. The device (CD) according to claim 1, comprising a display screen (DS), and the microcontroller (MC) is adapted for managing said display screen (DS).

4. The device (CD) according to claim 3, wherein the microcontroller (MC) is adapted for generating a one-time password upon entering of a predetermined code on the keyboard (KB), and displaying said one-time password on the display screen (DS).

5. The device according to claim 3 wherein said display screen is located on the same side as said active electrodes of said keys.

6. A method to transmit a password from a first device having a capacitive keyboard to a second device having a capacitive screen, comprising:
placing the device on a capacitive screen;
varying the voltage of the active ground plane or varying the capacitance of the active electrode allowing the capacitive screen to detect positioning of the device on the capacitive screen; and
applying low-frequency pulses on the active ground planes of said plurality of keys by varying the voltage of the active ground plane of said plurality of keys or varying the capacitance of the active electrode of said plurality of keys, wherein
combinations of voltage variations on the active ground planes correspond to codes corresponding to the one-time password.

7. The method of claim 6, wherein the keyboard (KB) comprise four active electrodes (AEL) and four active ground planes (AGP) used for emulating the sequence of tactile contacts.

8. The method according to claim 6, wherein the device further includes a display screen (DS), the method comprising operating the microcontroller (MC) to manage said display screen (DS).

9. The method according to claim 8, further comprising operating the microcontroller (MC) to generate a one-time password upon detecting entry of the predetermined code on the keyboard (KB), and to display said one-time password on the display screen (DS).

10. The method according to claim 3 wherein said display screen is located on the same side as said active electrodes of said keys.

* * * * *